Patented Apr. 1, 1930

1,753,185

UNITED STATES PATENT OFFICE

DAVID SPENCE, OF NORWALK, CONNECTICUT, ASSIGNOR TO INTERCONTINENTAL RUBBER COMPANY, OF NEW YORK, N. Y., A CORPORATION OF DELAWARE

EXTRACTION OF RUBBER FROM GUAYULE, ETC.

No Drawing.   Application filed May 12, 1926.   Serial No. 108,700.

This invention relates to improvements in the extraction of rubber from rubber-bearing plants and shrubs, and particularly to the extraction of rubber from guayule plants or shrubs, and it includes improvements both in methods of extraction, and in the extracted rubber products.

While the invention is applicable to the extraction of rubber from various rubber-bearing plants, shrubs and vines which abound in different parts of the world, it is of special advantage in its application to the extraction of rubber from the guayule shrub, and it will be more particularly described in connection therewith.

The shrub commonly known as the guayule shrub, abounds in northern Mexico and to some extent in the United States. It is harvested by cutting or by pulling up by the roots and is then usually left for a time in the sun to dry or cure. The cured shrub is usually baled and forwarded in that form to the factory for the extraction of the rubber therefrom. The period of time which elapses between harvesting of the shrub and extraction of the rubber varies greatly, depending upon a number of factors, some beyond control.

It is well known that the rubber in the guayule plants or shrubs undergoes deterioration if the harvested shrubs are kept for any considerable time before the extraction of the rubber therefrom, even where the plants are properly harvested and in prime condition when harvested. This deterioration is progressive in character, and, if the harvested shrubs are kept for any considerable time before the extraction of the rubber therefrom, the extracted rubber is of inferior quality, being soft and sticky, and the yields are low. Further deterioration of the rubber may take place during extraction, particularly where the shrubs and the rubber therein have undergone decomposition or deterioration before extraction so that various decomposition products of the plant are present during extraction.

Furthermore, even where the rubber extracted is not soft and sticky as judged by present day standards, when extracted, it is liable to deteriorate during its subsequent shipment and storage and before it is used, particularly where it is kept for a considerable period of time; and, where the rubber is of deteriorated or inferior quality when extracted, it is liable to undergo still further deterioration after extraction and during transportation and storage.

These difficulties and objections are well recognized in the industry. Modified methods have been proposed of collecting the shrub in the field, of storing of the shrub, and of extraction of the rubber therefrom, but in so far as I am aware no means have heretofore been known for overcoming the objections and difficulties above referred to. The loss of yield of extractable rubber from the guayule shrub, due to deterioration, has resulted in enormous commercial losses in the industry; while the inferior quality of the extracted rubber or much of the extracted rubber, imposes limitations on its use in commercial manufacture and a corresponding decrease in its value in commercial use.

The present invention provides improved methods of treatment of the guayule shrubs and of extraction of the rubber therefrom, whereby the extraction of the rubber from the shrub is improved, whereby deterioration or further deterioration of the rubber content of the shrub is avoided or minimized, and whereby a new and improved rubber product is produced of improved physical quality and of such stability that it does not undergo the objectionable deterioration which has heretofore commonly occurred.

According to the present invention, I treat the rubber in the guayule shrub before or during the extraction of the rubber therefrom, with a preservative or stabilizing agent which will stabilize or preserve the rubber against objectionable deterioration; or I treat the extracted rubber with such a preservative or stabilizing agent. The invention includes various methods by which such treatment of the rubber prior to or during or after extraction from the shrubs, can be effected, as hereinafter more fully described.

As stabilizing or preservative agents, I use materials which prevents the physical degeneration or deterioration of the rubber, which is sometimes referred to as depolymerization. Among such stabilizing or degeneration-preventing agents may be mentioned certain organic nitrogenous bases and particularly certain amines and derivatives of amines. A particularly suitable agent is dimethylpara-phenylenediamine, and I will refer more particularly to the use of this agent in the further description of the processes of the invention, although other agents may be used.

The deterioration of guayule rubber, both prior to, during and after extraction, has been considered to be due to oxidation, and it may be that oxidation plays some part in such deterioration. My investigations, however, have led me to consider this deterioration a depolymerization without any appreciable or considerable oxidation. Whatever the explanation may be, this degeneration can be effectively prevented or reduced by treatment of the rubber in accordance with the present invention.

In one method of procedure, I treat the rubber in the shrub before extraction with the stabilizing or preservative agent, and I then subject the thus pre-treated shrub to extraction. In such case, the added preservative or stabilizing agent exerts its effect upon the rubber, in part or in whole, prior to the extraction operation, but it will nevertheless be present during the extraction operation, and this operation will be modified and benefited thereby. Where the harvested shrubs are to be kept for any considerable time before extraction, they can advantageously be treated soon after harvesting and before they have undergone any objectionable deterioration, and the rubber in the shrubs can thereby be stabilized and preserved so that it will not undergo the usual rapid deterioration during the time elapsing before extraction. When shrubs which have thus been treated and preserved or stabilized are subjected to extraction, the stabilized or preserved character of the rubber in the shrubs, and the presence of the stabilizing agent, will enable the extraction to be carried out with advantage. Even where the shrubs are not to be kept for prolonged periods of time before extraction, they may nevertheless advantageously be treated in many cases with the preservative or stabilizing agent, inasmuch as the agent can be effectively incorporated in the shrub during such preliminary treatment and its benefit will be obtained during the subsequent extraction treatment. Where the harvested shrub will be kept for an uncertain or indefinite period of time after harvesting and before extraction, the uniform treatment of all harvested shrubs will insure that it is all stabilized and preserved, whether the rubber be extracted immediately or at some future time, or whether different portions of the shrub are treated at different times, some immediately and some after storage.

Even where the harvested shrub reaches the extraction mill promptly after harvesting, and in prime condition, it may nevertheless be advantageously treated with the stabilizing agent before it is subjected to the extraction operation, thus incorporating the stabilizing agent in the shrub, and treating the rubber content of the shrub therewith, prior to the beginning of the extraction operation.

The preliminary treatment of the shrub before extraction can be carried out in various ways. The shrub can be treated with the agent before it is crushed or ground, or it may be subjected to a crushing operation and treated with the agent during such operation, or subsequent thereto. The treament may be effected by immersing the shrub in a solution of the stabilizing agent for a sufficient period of time, or by spraying the shrub with a solution of the agent, or by bringing the agent into contact with the shrub in vapor form or in some other way. A solution of the stabilizing agent may be run over the shrub while it is being subjected to the crushing operation, which operation usually precedes any operation for extraction of the rubber. It will be evident that the time required for immersion of the shrub in the solution or for treatment in some other way will vary with the condition of the shrubs, the temperature of the solution, and the nature and amount of stabilizing agent therein, etc. The treatment can be promoted by heating the treating solution. This preliminary treatment of the shrub before extraction is described in my companion application Serial No. 107,830, filed May 8, 1923. As an example of such preliminary treatment of the shrub, the same may be immersed in an ordinary tank containing a solution with 1% of dimethyl-para-phenylenediamine in it, and with agitation of the solution to insure uniform treatment of all parts of the shrub. The period of immersion can be varied and the solution can be used over and over again, with further additions of dimethyl-para-phenylenediamine as necessary, for treating successive amounts of the shrubs to insure that the rubber content thereof absorbs a sufficient amount of the dimethyl-para-phenylenediamine to be stabilized thereby.

Where the treated shrub is not to be placed in storage but is to be subjected to extraction immediately, or shortly after the preliminary treatment with the stabilizing agent, this preliminary treatment may be carried out as a part of the operations of the extraction mill. For example, the crusher rolls which are now commonly used to crush the shrub and to prepare it for the subsequent extraction, may be used to crush the shrub which is to be subjected to the treatment with the stabilizing agent, and this treatment can be carried out during the crushing by running a solution of the stabilizing agent over the crushing rolls, or by passing the crushed shrubs to a container or receptacle containing a solution of the stabilizing agent, or by otherwise subjecting the crushed shrubs to the action of a stabilizing agent for a sufficient time to insure effective action of the agent upon the rubber content of the shrubs.

The treating solution, which is used for the preliminary treatment of the shrubs before extraction, may accompany the treated shrub, in whole or in part, during the extraction, by introducing a part or all of the treating solution with the shrub into the pebble mill or other mechanical extracting devices; or the excess treating solution may be separated from the treated shrub and used over again for treating subsequent amounts of shrubs. By draining the excess amount of solution from the treated shrubs, the crushed shrubs will then pass to the extraction operation with only such content of the stabilizing agent or agents as is absorbed by the shrubs and the rubber therein from the preliminary treatment, together with such amount as may be carried along mechanically therewith. In such case, a more concentrated solution of the treating agent may be employed, and the treating solution is kept out of the extraction operation, except for such amounts of the stabilizing agents as are absorbed by and carried into the extraction mill by the treated shrubs.

In the continuous operation of an extraction mill, the crushing of the shrubs prior to extraction can be carried out continuously, and the extraction itself can be carried out in a continuous or substantially continuous manner. The preliminary treatment of the shrubs with the stabilizing agent can also be carried out in a continuous manner, for example, by crushing the shrubs and discharging the crushed shrubs continuously into a treating solution and continuously withdrawing the treated shrubs therefrom or continuously passing the treated shrubs and treating solution into the extraction operation. A solution of dimethyl-para-phenylene-diamine of varying strength, e. g. a fraction of a per cent up to 1% or more, can be used in such continuous process.

Instead of treating the shrub prior to extraction, the untreated shrub can be crushed and fed to the extraction mill and the treating agent may be added in the mill during the extracting operation. Thus, where the extraction is carried out in pebble mills, a solution of the stabilizing agent can be added to the pebble mills instead of, or in addition to the water which is commonly used, so that the stabilizing agent will be present in the pebble mill and will act upon the shrub and upon the rubber content thereof during the grinding and extracting operation. During the operation of the pebble mill, the particles of rubber in the shrub are separated from the fibre and are agglomerated into what are commonly known as "worms." During the pebble mill operation, the crushed shrubs are subjected to a combined rubbing, squeezing and percussive action, and, with the stabilizing agent present in the solution in contact with the shrubs, it will have an opportunity of acting upon the individual particles of rubber in the shrubs and its action will be continued during the continuation of the extraction operation.

A stabilizing agent such as dimethyl-para-phenylene-diamine is not only soluble in water but is also soluble in or absorbed by, the rubber, so that it will be extracted from the water solution to a greater or less extent by the rubber; and, inasmuch as the rubber worms are gradually formed by the agglomeration of a large number of minute particles of rubber set free from the fibre by the extraction operation, it will be evident that the agent will have an opportunity to act upon all parts of the rubber in a most intimate manner. This operation will impoverish the solution to a greater or less extent. A large amount of water is commonly used during the pebble mill extracting operation, and, where the stabilizing agent is added thereto, the solution of the stabilizing agent may be a dilute one, but its dilution will be compensated for by the intimate contact of the solution with the shrub and with the rubber during the extracting operation.

Stabilizing agents which are difficultly soluble in water may be added to the ball mill charge in solid form, and their dissolution in the water will be promoted by the grinding operation to which they are subjected so that the solution may be formed during the extracting operation.

Where the crushed shrub is treated with a solution of a stabilizing agent before it enters the extraction mill, a part or all of the solution used for this preliminary treatment may be added to the extraction mill with the treated or partially treated shrub, in which case the treatment will be continued during the extracting operation. In case a sufficient amount of the stabilizing agent has not been used during the preliminary treatment, a further amount can be added to the pebble mill during extraction.

Furthermore, shrub which has been preliminarily treated to preserve it against objectionable deterioration with a sufficient amount of stabilizing agent may have a further amount of the same or a different stabilizing agent added at the time of its treatment for the extraction of the rubber therefrom. Such a further amount of the stabilizing agent may be added in the manner above described, for example, to the crushed shrub before it is fed to the extraction mill, or to the extraction mill itself, so that the extraction operation will be carried out in the presence of the added agent or agents. If the shrub has been preliminarily treated with a sufficient amount of stabilizing agent, or is otherwise in satisfactory condition, the further addition of an agent or agents at the time of the extraction can be omitted.

After the crushed shrub has been subjected to extraction by grinding for a sufficient period of time in a pebble mill and with resulting agglomeration of the rubber into the form of worms, the pebble mill charge can then be treated for the separation of the worms from the admixed fibres in the usual way. This further treatment can be carried out, with further dilution, in a further pebble mill, or in other suitable apparatus. Such a further pebble mill operation will facilitate the separation of the worms from the disintegrated fibre. These worms are then separated by flotation, for example, by skimming them off of the surface of separating tanks.

The worms when first obtained may still be admixed with varying amounts of bark or cork. In order to effect separation of this cork from the worms, the mixture of worms and cork are usually heated with water or subjected to heat and pressure to waterlog the cork and cause it to sink. For example, the worms may be heated for a period of about two hours at steam pressure of about 100 pounds and with the application of hydraulic pressure to waterlog the cork, etc. mixed with the rubber. A solution of the stabilizing agent may be added to the admixed worms and cork at this stage of the treatment, for example, a 1% solution of dimethyl-para-phenylenediamine in water. In case the rubber has been produced without treatment with the stabilizing agent, the treatment of the worms in this way will effect a marked change in the character of the rubber produced, although this change may not be as pronounced as that produced by a more prolonged treatment of the worms, at a later stage, with a solution of the stabilizing agent.

In case the bagasse obtained as a by-product of the extraction process contains soft, sticky rubber worms which do not readily separate, this bagasse can be further treated with the addition of a solution of the stabilizing agent to convert the soft, sticky worms into harder, firmer worms which can then be more readily separated from the bagasse. This treatment will not ordinarily be necessary where the main milling operation has been carried out in the presence of a stabilizing agent; but where the shrubs are extracted without the presence of a stabilizing agent, and particularly where the shrubs are degenerated before treatment, or are subjected to degeneration during extraction, as where the extraction is unduly prolonged, and where there is a resulting tendency of the rubber to remain unseparated from the bagasse, this tendency can be overcome or minimized by the addition of a stabilizing agent to the bagasse during the latter portion of the extracting operation, or even to the bagasse after the normal separation of worms therefrom and in order to effect a further separation.

The treatment of the shrub and of the rubber content thereof prior to or during extraction, for example, with a solution of dimethyl-para-phenylenediamine, has a marked effect upon the action of the rubber during the extraction operation, and particularly where the rubber extracted would otherwise be soft and sticky. Instead of giving soft and sticky worms, such treatment gives worms of improved properties and may also give a materially increased yield of extracted rubber.

As illustrating the advantages of the present invention, I may mention a comparative test made on two lots of the same ground guayule shrub, one of which was left untreated and the other treated in accordance with the present invention. The treated lot was soaked in a solution in water containing about ½% of dimethyl-para-phenylenediamine for about 24 hours, while the other lot was left untreated. Both lots were then permitted to remain spread out and exposed to the atmosphere for a period of about 3 weeks, after which the two lots were separately subjected to mechanical extraction, passing them thru the pebble extraction mill, etc. In the case of the untreated lot of ground shrubs, a considerable deterioration took place and the worms obtained were small, soft and rather sticky, and after drying in a vacuum, gave a rubber product of only fair quality and somewhat tacky. The treated shrubs gave large, hard and dry worms and the resulting rubber, after vacuum drying, was excellent and free from tackiness, and it was moreover obtained with considerably increased yield.

The process is applicable not only to prime shrub which has been harvested and is extracted before it has undergone any objectionable deterioration, but also to shrub which has undergone more or less deterioration of its rubber content. By treating undeteriorated prime shrub, or shrub which has been preserved in its prime undeteriorated condition, the extracted rubber will be obtained in an undeteriorated condition and with improved properties. When the rubber in the shrub has undergone more or less deterioration before extraction, the treatment of the rubber of the shrub prior to or during extraction, in the manner hereinbefore described, will nevertheless have a beneficial effect in neutralizing or overcoming, to a greater or less extent, such deterioration.

Instead of, or in addition to, treating the rubber prior to or during extraction from the shrub, it can be advantageously treated after the rubber worms have been produced and separated from admixed fibre and cork. In the case of prime shrub, the rubber can be extracted in the usual manner and with the production of normal worms such as are obtained from prime undeteriorated shrub. These worms can be improved by subjecting them to a further treatment with the stabilizing agent. So also, where the rubber is extracted from shrubs which have been preserved and stored and which contain their rubber content in an undeteriorated condition, the extracted rubber can be further improved by treating the rubber worms after separation, particularly where the amount of stabilizing agent used in treating and preserving the shrubs was small in amount. Furthermore, separated worms produced when the stabilized agent has been added prior to or during extraction, may be still further improved, in some cases, by subjecting them to a further treatment with a stabilizing agent.

The treatment of the worms, when produced in the absence of a stabilizing agent, as well as of worms which have been produced in the presence of such an agent, may be carried out in various ways. These worms, when first obtained, are wet, containing a considerable amount of water. They are advantageously treated in this wet condition, which seems to be favorable for the action of the stabilizing agent thereon. The treatment of the worms with the stabilizing agent may be effected, for example, merely by immersing the worms in a solution of the stabilizing agent, for example, a 1% solution of dimethyl-para-phenylenediamine for a period of 48 hours and using, for example, 30 parts by weight of the solution to 25 parts by weight of the wet worms. The strength of the solution as well as the amount of solution and the time and temperature of the treatment, can be varied. For example, solutions as low as $\frac{1}{10}$ of 1% can be used and will produce a marked improvement in results, although a stronger solution, e. g. 1%, was found more suitable. By increasing the temperature of the solution during the dipping process, the time required can be reduced. The treatment of the worms with a solution of a stabilizing agent can also be effected with squeezing of the worms during the treatment, or by the application of pressure to facilitate the treatment. This treatment can, for example, be carried out in a beater washer or similar device where the mechanical squeezing and rubbing action will facilitate the penetration of the worms by the treating solution.

The treated worms, produced in accordance with the present invention, form a new and valuable commercial product. As compared with ordinary worms produced in the ordinary way in the absence of a stabilizing agent, they are of firmer texture, free from the marked tendency of ordinary worms to become sticky, and characterized by stability and resistance to deterioration and so-called "tackiness". Whereas the ordinary wet worms cannot be readily dried commercially in a vacuum drier, the improved treated worms of the present invention can be so readily dried, and can even be dried at ordinary atmospheric pressure, i. e., without the use of a vacuum. With ordinary wet worms, it is customary to sheet the worms in order to convert them into a form which permits the rubber to be dried. The improved worms of the present invention can be dried without the necessity of sheeting before drying, although they can also be sheeted and dried in sheet form without the necessity of observing precautions necessary with present day sheeted worms. Owing to the stability of the new worms and the possibility of drying them in the worm state, the drying operation results in the production of another new commercial product, namely, the dried stabilized worms. These dried worms can be compressed into bales or formed into sheets for transportation and marketing. By compressing the dried worms into bales and shipping them in that form, it is possible to omit the sheeting operation and eliminate the sheeting mill from the extraction factory.

I have found that where ordinary worms had a pronounced degree of stickiness such that it was impossible to dry them in a vacuum dryer, this objectionable stickiness was completely overcome by immersing them for 48 hours in a 1% solution of dimethyl-para-phenylenediamine and a very much dryer and better looking product in physical appearance was obtained as compared with the untreated rubber; and with ordinary worms of widely varying degrees of deterioration and stickness, the stickness was overcome and an improved product produced by treating the worms in the manner above described.

With deteriorated shrub, the yield of extracted rubber obtained by present day methods may be low and the rubber worms are usually soft and sticky and much of the very soft sticky rubber may be left behind in the bagasse of the mill without being extracted in the form of worms. I have recovered rubber of this kind from bagasse by slightly acidifying it and blowing in steam, obtaining an additional amount of fine, soft, sticky worms, and I have obtained a good firm dry rubber free from stickiness by treating these worms in the manner above described.

My investigations lead me to believe that the deterioration of guayule rubber is probably due in last analysis to a physical degeneration or depolymerization which is perhaps the reverse of the building up or polymerizing action by which the rubber is produced in the plant; and it may be that the action of the stabilizing agent, upon deteriorated rubber, causes a repolymerization or regeneration, although I do not wish to limit myself by any theoretical explanation of such action.

I have further found that the improved worms of the present invention can advantageously be treated for the extraction of part or all of the resin therefrom, and a resulting partially or completely deresinated product produced. If caustic alkali is present during the extraction operation, the resin will be to a greater or less extent extracted from the rubber during the extraction of the rubber from the shrub. The worms themselves, however, can be digested with alkali to free them from resins to a greater or less extent, and this treatment with alkali may be effected on the treated worms of the present invention or preferably upon untreated worms which may subsequently be treated with a solution of a stabilizing agent. In this way, worms which are partially deresinated, as well as stabilized, can be obtained.

The resin can be removed with substantial completion from the worms by extraction with a solvent such a acetone or alcohol, and this extraction can advantageously be carried out to give a more or less completely deresinated worm product. Where, the worms are stabilzied by the process of the present invention, the acetone extraction will be facilitated because of the harder and firmer character of the worms. After extraction of the resin, the extracted worms may be subjected to a further treatment with the stabilizing agent. The acetone-extracted worms, when untreated worms are extracted, can for example, be treated with a 1% solution of dimethyl-para-phenylenediamine in the manner above described; or the worms produced by the process of the present invention may be similarly extracted with acetone and then again treated with a solution of the stabilizing agent.

The improved products of the present invention are distinguished from present day guayule products by increased resistance to deterioration or "tackiness", and have improved physical properties which permit them to be handled and used with advantages not presented by present day guayule products.

The improved products of the present invention have improved properties both in the raw and unvulcanized state and also in the vulcanized state and also have improved properties during vulcanization.

In the preceding description I have mentioned dimethyl-para-phenylenediamine as a suitable stabilizing or preservative agent, and this is an advantageous agent to use as such a preservative or degeneration-preventing agent. It is an amine and more particularly it is an aromatic diamine. It is soluble in water to a sufficient extent to enable it to be used in water solution, and it is also soluble in or absorbed by the rubber. It is an organic nitrogenous base, and its presence, even in small amount, in the rubber extracted from the preserved shrub imparts improved properties, including improved vulcanizing properties, to the extracted rubber. I do not limit myself however to the use of this agent, as other organic nitrogenous bases can be used in a similar way, for example, para-phenylenediamine, and particularly agents which are soluble in or absorbed by the rubber.

In using a solution of diamethyl-paraphenylenediamine, etc., a small amount of sodium sulfite may advantageously be added, so that the treatment of the shrub prior to or during extraction or of the extracted rubber will be carried out with e. g., a 1% solution of dimethyl-para-phenylenediamine which also contains a small amount of sodium sulfite.

The solution of dimethyl-para-phenylenediamine may also be used in combination or admixture with other reagents, for example, lime or caustic soda, etc. may be added prior to or during the treatment of the shrub for the extraction of the rubber therefrom, so that the extraction will take place both in the presence of the dimethyl-para-phenylenediamine and of the caustic soda or lime or other reagent; or lime or caustic soda, etc. may be added during the mechanical extraction and the resulting rubber worms may be treated with a solution of the dimethyl-para-phenylenediamine or other stabilizing agent.

Among other organic nitrogenous substances may be mentioned other organic amines or bases of both the aromatic, aliphatic or heterocyclic series and certain derivatives thereof, for example, piperidine and other amines, condensation products of amines with aldehydes, for example, a condensation product of acetaldehyde with anilin or a condensation product of aldol and alphanaphthylamine, etc.

I claim:—

1. The improved method of extracting rubber from guayule and other rubber-bearing plants, etc., which comprises subjecting the plants to mechanical extraction of the rubber therefrom in the presence of stabilizing agents.

2. The method according to claim 1 in which the plants are treated with the stabilizing agent before they are subjected to mechanical extraction.

3. The process according to claim 1 in which the plants are preliminarily crushed or ground and treated with the stabilizing agent during or subsequent to crushing or grinding and prior to the mechanical extraction.

4. The process according to claim 1 in which the plants are treated after harvesting and before the rubber content thereof has undergone objectionable deterioration.

5. The process according to claim 1 in which the treated plants are stored in a preserved condition and are subsequently subjected to mechanical extraction.

6. The method according to claim 1 in which the stabilizing agent is added and caused to act upon the rubber content of the shrub during the mechanical extraction of the rubber therefrom.

7. The method according to claim 1 in which a stabilizing agent is added to the shrub prior to the mechanical extraction and a further amount of a stabilizing agent is added at or during the time of mechanical extraction.

8. The process according to claim 1 in which the rubber content of the shrubs extracted has undergone partial deterioration prior to the mechanical extraction operation, and in which this operation is carried out in the presence of such a stabilizing agent.

9. The method according to claim 1 in which rubber-containing bagasse from the mechanical extraction process is treated with an additional amount of stabilizing agent to facilitate the separation of the rubber from the bagasse.

10. The method according to claim 1 in which the admixed rubber worms and cork obtained from the mechanical extraction are subjected to the action of a stabilizing agent.

11. The method of treating rubber in the form of worms, resulting from the mechanical extraction of the rubber from guayule, which comprises subjecting the worms to the action of readily oxidizable nitrogenous stabilizing agents.

12. The improvement in the treatment of rubber produced in accordance with the process of claim 1 which comprises extracting the same with a solvent for the resin and subsequently drying the same.

13. The method of treating rubber in the form of worms, resulting from the mechanical extraction of the rubber from guayule, which comprises subjecting the worms to extraction for the removal of part or all of the resin therefrom and subjecting the extracted worms to the action of readily oxidizable nitrogenous stabilizing agent.

14. Guayule worms containing a small amount of dimethyl-para-phenylenediamine.

15. Guayule or similar rubber produced in accordance with the processes of claim 1 and being stabilized against deterioration.

16. The improved method of extracting rubber from guayule plants and other rubber-bearing plants which comprises subjecting the plants to mechanical extraction of the rubber therefrom in the presence of dimethyl-para-phenylenediamine.

17. The process according to the preceding claim in which the plants are treated after harvesting and before the rubber content thereof has undergone objectionable deterioration and are stored in a preserved condition before they are subsequently subjected to mechanical extraction.

18. Guayule rubber produced in accordance with the process of the next to the preceding claim, such rubber being stabilized against deterioration.

In testimony whereof I affix my signature.

DAVID SPENCE.